Nov. 24, 1964  J. J. MELLON, JR., ETAL  3,157,890
EJECTION DEVICE FOR AIRCRAFT CRASH DYE MARKER
Filed Nov. 29, 1963                               2 Sheets-Sheet 1
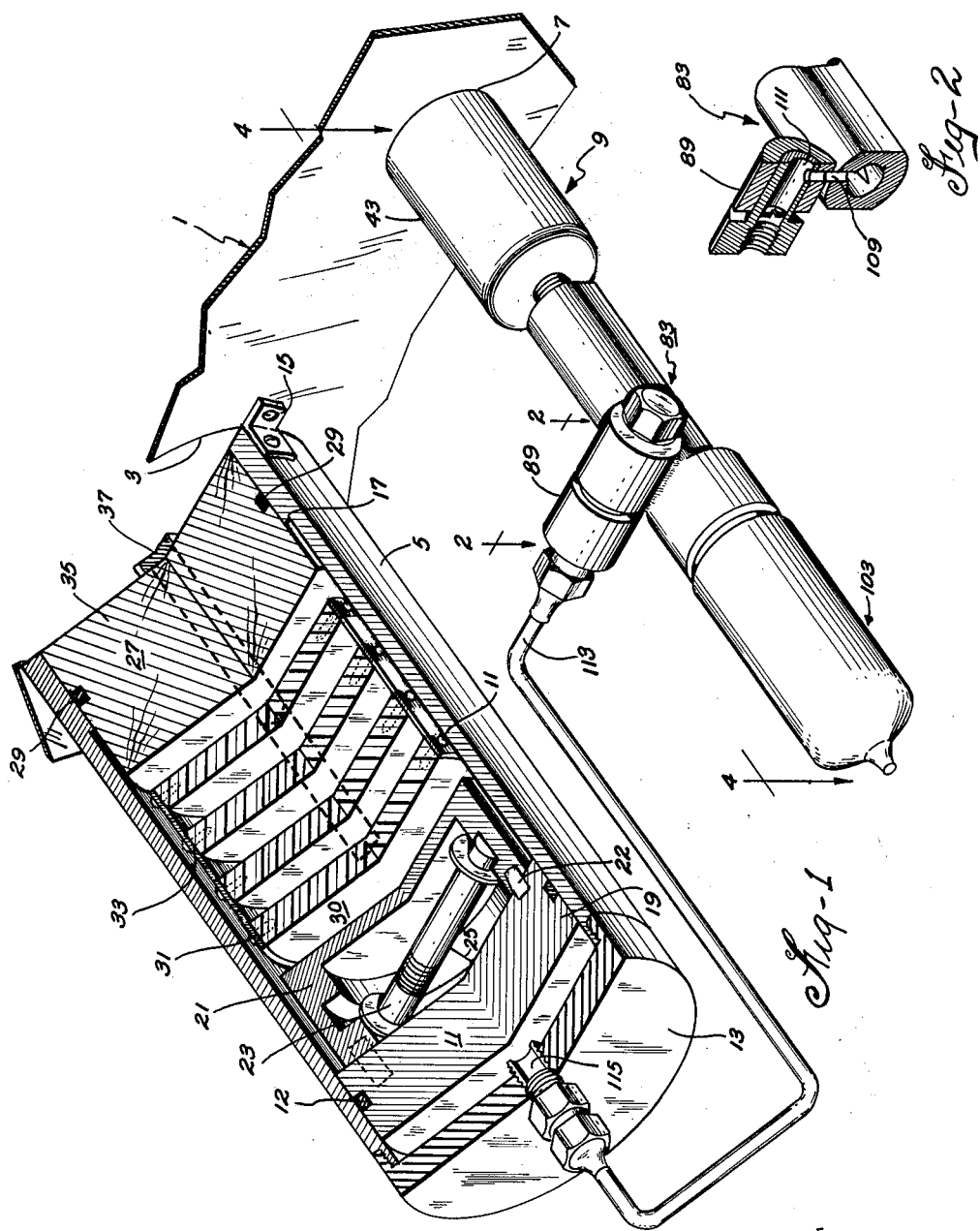

Nov. 24, 1964  J. J. MELLON, JR., ETAL  3,157,890
EJECTION DEVICE FOR AIRCRAFT CRASH DYE MARKER
Filed Nov. 29, 1963                          2 Sheets-Sheet 2
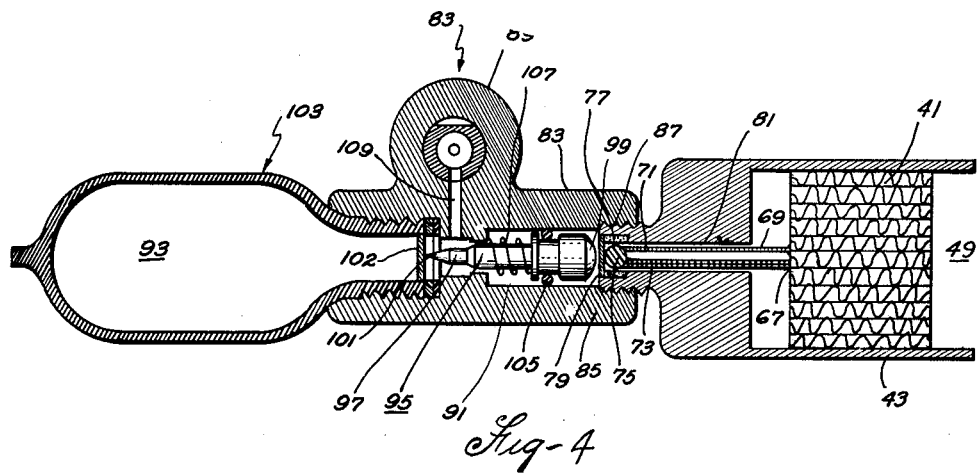
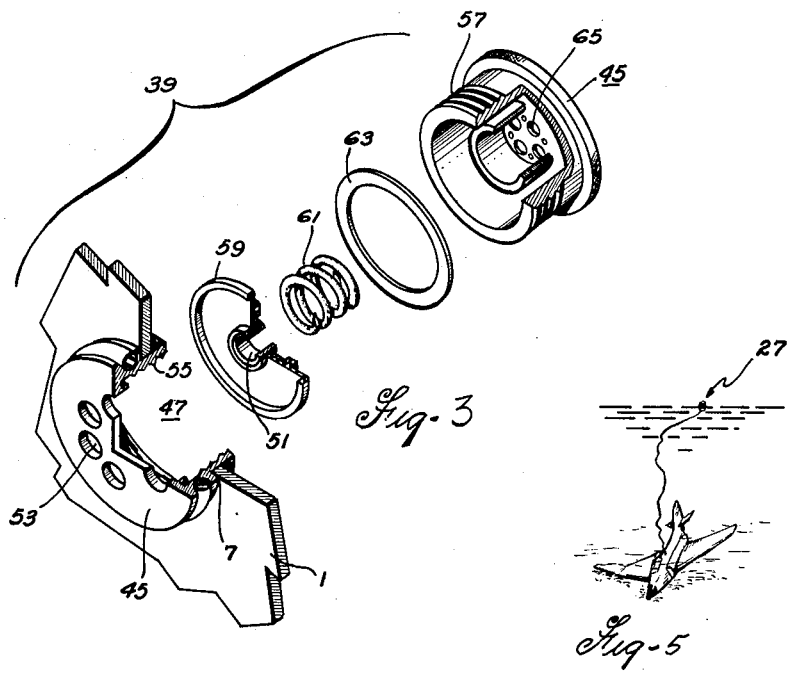
INVENTORS
John J. Mellon, Jr.
Jonathan Harding
William James Zarkowski, Jr.
BY
Arthur L. Collins

3,157,890
EJECTION DEVICE FOR AIRCRAFT CRASH DYE MARKER

John J. Mellon, Jr., Woodbury Heights, Jonathan Harding, Camden, and William James Zarkowski, Jr., Stratford, N.J., assignors to the United States of America as represented by the Secretary of the Navy
Filed Nov. 29, 1963, Ser. No. 327,160
4 Claims. (Cl. 9—9)
(Granted under Title 35, U.S. Code (1952), sec. 266)

The invention described herein may be manufactured and used by or for the Government of the United States of America for governmental purposes without the payment of any royalties thereon or therefor.

This invention relates to an improved automatic aircraft crash marking device for marking the point at which an aircraft crashed into a body of water and submerged itself therein.

Generally, this device comprises a buoyant marker which is mounted on an aircraft. A portion of the device is exposed along the outer skin of the aircraft so that it will come into contact with the water in the event of a sea crash landing. Water pressure opens a hydrostatic pressure relief valve located in the exposed portion whereby water enters into and activates a battery. Current, flowing from the battery, triggers an explosive which causes a pin to penetrate a hermetically sealed cylinder containing a pressurized gas. The pressure of this gas escaping from the cylinder causes the ejection of this buoyant marker from the aircraft. By employing an explosive to release a gas which drives the marker buoy from the aircraft, we have improved upon the reliability factor of prior art aircraft marker systems which use either water pressure or mechanical springs to actuate the release mechanism. For example, Wales, Jr. (Patent No. 2,803,838) employs water pressure to release a gas from a cylinder located behind a marker buoy. The pressure of the gas streaming from the cylinder pushes the buoy into the water. If the hydrostatic pressure required to puncture the gas cylinder of the Wales device exceeds or is equal to the pressure of the gas escaping from the cylinder, the marker buoy will not be ejected. Since the device of the subject application does not depend upon hydrostatic pressure to release the buoy, this problem is eliminated. Another marker device employed a soluble pellet in combination with a mechanical spring release means to eject a marker buoy from a crashed aircraft; however, this device was subject to inadvertent releases because of humidity effects in the atmosphere. Other devices use mechanical springs for release of a dye marker which are subject to accidental releases caused by the vibrations of the aircraft, and from impact due to hard landings. In summary, there is not a satisfactory dye marker crash locator device in operation on an aircraft because of one or more of the difficulties in the ejecting mechanism mentioned hereinabove.

It is one object of this invention to provide an improved compact, light weight, inexpensive, and reliable crash marking buoy which is adapted to be automatically ejected from an aircraft making a forced landing at sea when the aircraft is submerged to a predetermined depth in water.

Another object of the present invention is to provide an air-sea rescue device which is simple in construction and which releases promptly and positively a dye marker upon submersion within a body of liquid.

A further object of the invention is to provide an improved marker of the class described which can be mounted in the aircraft fuselage flush with the skin thereof in such a manner that the streamlining of the aircraft is not affected thereby.

A further object of the invention is to provide an improved aircraft marker of the class described which is so constructed that when in assembled condition within an aircraft fuselage, it is well protected from the effects of the weather.

A further object of the invention is to provide an improved aircraft marker which is strong and durable, which is relatively simple in construction, and which is otherwise well adapted for the purposes described.

Various other objects and advantages of this invention will be readily appreciated as the same becomes better understood by reference to the following detailed description.

In the drawings accompanying and forming a part of this specification, wherein like characters of reference indicate the same parts in all of the views.

FIG. 1 is a perspective view partially in section showing the preferred form of the invention in assembled condition.

FIG. 2 is a detailed sectional view of a portion of the ejection mechanism illustrated in FIG. 1 and taken along a line substantially corresponding to line 2—2 of FIG. 1.

FIG. 3 is an exploded view of the valve portion of the ejection mechanism, parts being broken away.

FIG. 4 is a side plan view in section of the ejection mechanism taken along a line substantially corresponding to line 4—4 of FIG. 1.

FIG. 5 is a pictorial view of the present device in use.

Referring more particularly to FIG. 1 of the drawing, the numeral 1 indicates the plating or fuselage of a craft in which the improved marker is mounted. The skin 1 is formed with an aperture 3, preferably circular, through which is suitably positioned a housing 5, and a second aperture 7 through which is suitably positioned the ejection mechanism 9 of our improved device.

The housing 5 consists of a cylindrical sleeve portion 11 which has end plate 13 affixed to one end thereof in any suitable manner for the purpose of sealing that respective end. The end of sleeve 11 which is remote from the end which has end plate 13 affixed thereto is secured to the plane's fuselage 1 by either the bracket means 15 or by any other suitable fastening means.

The inside diameter of sleeve 11 is enlarged as at 17 to receive a piston 19 which is normally positioned adjacent end plate 13 and held tightly against the side of sleeve 11 by the gasket 12.

The cylindrical member 35 of the buoy assembly 27 is composed of a suitable buoyant material such as balsa wood or the like and is secured within the open end of housing 5 by the resilient fastening ring 29 which provides a water tight seal against the sleeve 11. The individual spaced dye marker cakes or sections 30 of the buoy assembly 27, each of which is molded from a composition comprising a sodium fluorescein dye bound in a matrix of polyvinyl alcohol, are positioned as shown within sleeve 11 adjacent the interior surface of member 35. The reel or spool 23 is mounted within its subhousing 21 which is positioned within sleeve 11 between the piston 19 and the spaced dye marker sections 30. Opposite ends of the cord or the like 25 wrapped about spool 23 are connected to the piston 19 and the spool. Pins 22 are preferably provided to align the buoy assembly 27 in a predetermined manner within the housing 5. The various component sections of the buoy assembly 27 including member 35, dye marker sections 30 and the spool subhousing 21 are secured one to another by the stud or the like 37 in the manner shown in the drawing.

The release mechanism for the buoy assembly has been designed for quick and positive operation immediately upon immersion of the plane, and is shown in detail in FIGS. 2 to 4 inclusive. As shown therein, the fitting 45 of the hydrostatic pressure relief valve 39 of the release mechanism is secured in aperture 7 of the fuselage 1 of the aircraft in any suitable water tight manner. The internal threads 55 of the fitting 45 engage the external threads 57 of the complementary fitting 49 to form the internal chamber 47 in valve 39. Opposed ends of fittings 45 and 49 are provided with a plurality of openings 53 and 65. The sealing ring 63 between fittings 45 and 49 prevents leakage from the chamber 47. The diaphragm or the like 59 which includes the centrally disposed opening or passageway 51 is normally urged against the inner end of fitting 45 by the spring or the like 61.

Valve 39 is disposed within one end of casing 43 which is secured as shown to the inner surface of the fuselage 1 of the aircraft. The water activated battery 41 is also disposed within casing 43 and contains the necessary chemicals to produce an electrical potential when water comes into contact with the chemical constituents of the battery. Terminals 67 and 69 of battery 41 are connected by lead wires 71 and 73 to the electrically sensitive exploder or squib 75 which is embedded in the powder charge 77. The retaining disk or the like 79 of chipboard, corrugated paper, cardboard or other suitable material provides support for the powder charge in the neck of casing 43.

The cylindrical fitting 83 is threadedly secured to the neck of casing 43 as at 87. The cylindrical connector or fitting 89 is integrally connected to the upper surface of fitting 83. The opening or passageway 109 through fittings 83 and 89, the tubular conduit 113 and the connector 115 positioned in the end of housing 5 couples the chamber within fitting 83 with the interior of housing 5. The firing pin 95 within fitting 83 is normally urged against the powder charge retaining disk 79 as shown by the spring or the like 107. The pointed end 101 of the firing pin is normally disposed as shown opposite the disk or the like 102 which seals the compressed gas 93 within cartridge 103. Cartridge 103 is threadedly secured as shown in the end of fitting 83.

In operation when a craft, such as an airplane, equipped with this device is forced down at sea and begins to sink, hydrostatic pressure compresses spring 61 in valve 39 whereby the diaphragm 59 is forced away from the openings 53 permitting water to enter into passageway 51. This water exits through openings 65 into the battery 41 which is activated thereby. The battery completes a circuit through lead wires 71 and 73 with squib 75. The squib is activated to ignite a charge 77 which propels pin 97 forward in sleeve 91 whereby the point 101 punctures the seal 102 of cartridge 103 containing nitrogen gas under a pressure of 3000 p.s.i. The pin 97 is immediately retracted back to its original position by spring 107 after the gas filled cartridge 103 has been punctured.

The gas escapes into sleeve 91, travels up orifice 109, out the passageway 111, along the manifold 113 into the top of housing 5. The pressure of the gas expanding in the sleeve portion 11 of the housing operates piston 19 and the buoy assembly 27 is ejected into the sea to mark the site of the crash. The buoy assembly 27 is moored to piston 19 and the aircraft by cord 25. The fluorescein in the cakes 30 colors the water and identifies the immediate area of the crash.

The invention in its broader aspects is not limited to the specific mechanisms shown and described but departures may be made therefrom within the scope of the accompanying claims without departing from the principles of the invention and without sacrificing its chief advantages.

We claim:

1. A release mechanism for an air-sea rescue device wherein a marker buoy is carried in a housing secured to an aircraft and adapted to be released upon submergence of the aircraft, comprising in combination:

(a) a hydrostatic pressure responsive valve secured to the aircraft and adapted to permit water to enter therein;
    (b) an electric cell of the water-activated type connected to said valve and capable of generating an electric current only when water becomes accessible to said valve;
    (c) an explosive charge;
    (d) an electrically operated firing means for exploding said charge, said firing means being connected to said electric cell;
    (e) a sealed cartridge of compressed gas;
    (f) piercing means responsive to said exploding charge to puncture the sealed cartridge and release the compressed gas;
    (g) release means connected with the said cartridge and being responsive to the compressed gas to eject the buoy from the aircraft.

2. The combination of a submersible object and a crash marker device for marking the area in which said object has submerged itself in a body of water comprising:

(a) a housing, having one end open, fixed to said object;
    (b) a crash marker buoy slidably positioned in said housing and having sealing engagement with said housing at its open end;
    (c) piston means slidably positioned in the closed end of said housing;
    (d) a hydrostatic pressure responsive valve secured to the aircraft and adapted to permit water to enter therein;
    (e) an electric cell of the water-activated type connected to said valve and capable of generating an electric current only when water becomes accessible to said valve;
    (f) means forming a chamber between said electric cell and the piston means positioned in the housing;
    (g) a sealed cartridge of compressed gas within said chamber;
    (h) an explosive charge located in said chamber;
    (i) an electrically operated firing means for exploding said explosive charge, said firing means being connected to said electric cell;
    (j) piercing means responsive to said explosive charge to pierce said sealed cartridge for causing said cartridge to discharge the compressed gas into said chamber and to actuate the piston means to eject the buoy from said housing.

3. An ejection system for releasing a crash marker buoy into a body of water in which an aircraft has submerged itself comprising:

(a) a first housing adapted to be mounted on an aircraft;
    (b) a crash marker buoy positioned for relative movement within said housing, said crash marker buoy providing a closure for one end of said housing;
    (c) closure means forming a chamber between said buoy and the other end of said housing;
    (d) pressure responsive means slidably positioned in said chamber for ejecting the buoy into the water;
    (e) hydrostatic pressure responsive means adapted to being mounted on the said aircraft in juxtaposition to the first housing;
    (f) a second housing having one end connected to said hydrostatic pressure responsive means;
    (g) an electric cell of the water-activated type located in the end of said second housing contiguous to the hydrostatic pressure responsive means and capable of generating an electric current only when water becomes accessible to said cell;
    (h) an explosive charge located in the other end of said second housing;
    (i) an electrically operated firing means for exploding said explosive charge, said firing means being connected to said electric cell;
    (j) a supporting means connected to the other end of said second housing and having a recess therein which connects with the explosive charge located in the housing;

(k) a sealed cartridge of compressed gas mounted within said recess in said supporting means;

(l) piercing means located in the recess next to the explosive charge within said supporting means;

(m) spring means for maintaining said piercing means in spaced relationship with said cartridge until a predetermined pressure on said hydrostatic pressure responsive means permits water to enter the second housing and to activate the battery cell thereby exploding the charge which causes the piercing means to puncture the cartridge and to cause said sealed cartridge of compressed gas to discharge into the said recess;

(n) manifold means linking said recess in said supporting means with the chamber in said buoy whereby the compressed gas provides pneumatic pressure to eject said crash marker buoy from said first housing.

4. An ejection system for releasing a crash marker buoy into a body of water in which an aircraft has submerged itself comprising:

(a) a first housing adapted to be mounted on an aircraft;

(b) a crash marker buoy positioned for relative movement within said housing, said crash marker buoy providing a closure for one end of said housing;

(c) closure means forming a chamber between said buoy and the other end of said housing;

(d) pressure responsive means slidably positioned in said chamber for ejecting the buoy into the water;

(e) a hydrostatic pressure relief valve adapted to being mounted on the said aircraft in juxtaposition to the first housing;

(f) spring means suitably positioned in said valve for normally maintaining the said valve closed until said aircraft is submerged to a predetermined depth in said body of water;

(g) a second housing having one end connected to said hydrostatic pressure relief valve;

(h) an electric cell of the water-activated type located in the end of said second housing next to the said valve and capable of generating an electric current only when the valve has been opened by the spring means;

(i) an explosive charge located in the other end of said second housing;

(j) an electrically operated firing means for exploding said explosive charge, said firing means being connected to said electric cell;

(k) a supporting means connected to the other end of said second housing and having a recess therein which connects with the explosive charge located in the housing;

(l) a sealed cartridge of compressed gas mounted within said recess in said supporting means;

(m) a piercing pin located in the recess next to the explosive charge within said supporting means;

(n) spring means for maintaining said piercing means in spaced relationship with said cartridge until a predetermined pressure on said hydrostatic pressure relief valve opens said valve to permit water to enter the second housing and to activate the battery cell thereby exploding the charge which causes the piercing means to puncture the cartridge and to cause said sealed cartridge of compressed gas to discharge into the said recess;

(o) manifold means linking said recess in said supporting means with the chamber in said buoy whereby the compressed gas provides pneumatic pressure to eject said crash marker buoy from said first housing;

(p) an anchor line located in said first housing for connecting the buoy to the aircraft; and (q) visual indicating dye means located within the buoy and responsive to water to indicate the location of the buoy and the aircraft.

References Cited by the Examiner
UNITED STATES PATENTS

| 2,803,838 | 8/57 | Wales | 9—9 |
| 2,840,833 | 7/58 | Fruendt | 9—9 |

FOREIGN PATENTS 254,106   7/27   Italy.

FERGUS S. MIDDLETON, *Primary Examiner.*